United States Patent [19]

Shultz

[11] Patent Number: 5,698,917

[45] Date of Patent: Dec. 16, 1997

[54] ELECTROMAGNETIC BEARING WITH A STATIONARY ARMATURE CANNING ARRANGEMENT

[75] Inventor: Richard R. Shultz, Groton, Conn.

[73] Assignee: Glacier RPB Inc., Mystic, Conn.

[21] Appl. No.: 533,203

[22] Filed: Sep. 25, 1995

[51] Int. Cl.[6] .................. H02K 5/10; H02K 5/12
[52] U.S. Cl. ............. 310/87; 310/90; 310/90.5; 310/214; 310/215; 310/254
[58] Field of Search ............. 310/90.5, 90, 214, 310/215, 254, 87

[56] References Cited

U.S. PATENT DOCUMENTS

| | | | |
|---|---|---|---|
| 4,456,844 | 6/1984 | Yamamoto et al. | 310/87 |
| 4,539,499 | 9/1985 | Punch et al. | 310/214 |
| 4,547,690 | 10/1985 | Bath et al. | 310/214 |
| 4,683,391 | 7/1987 | Higuchi | 310/90.5 |
| 4,827,169 | 5/1989 | Habermann | 310/90.5 |
| 4,920,291 | 4/1990 | McSparran | 310/90.5 |
| 4,988,906 | 1/1991 | Littlefield | 310/90.5 |
| 5,015,159 | 5/1991 | Mine et al. | 417/366 |
| 5,051,637 | 9/1991 | Harris et al. | 310/90.5 |
| 5,072,146 | 12/1991 | New | 310/90.5 |
| 5,084,644 | 1/1992 | Harris et al. | 310/90.5 |
| 5,153,475 | 10/1992 | McSparran | 310/254 |
| 5,355,042 | 10/1994 | Lewis et al. | 310/90.5 |
| 5,490,319 | 2/1996 | Nakamura et al. | 29/596 |

FOREIGN PATENT DOCUMENTS 1414949  11/1975  United Kingdom .............. 310/90.5

*Primary Examiner*—Clayton E. Laballe
*Assistant Examiner*—Elvin G. Enad
*Attorney, Agent, or Firm*—Nixon & Vanderhye P.C.

[57] ABSTRACT

An electromagnetic bearing includes a canning arrangement (30, FIG. 2) for separating stator coils 33 from a suspension gap 21 containing gas at high pressure. The canning arrangement comprises a bridging member $38_1$ ... in each cell slot $31_1$, $32_2$ ... supported on notches 37 cut from the edges of bounding pole pieces $31_1$, $32_2$ ...., the surface of which bridging member facing the rotor comprises a support face set radially outwardly of the pole faces. A thin, deformable can member 40 is supported on the pole faces and deforms outwardly in response to pressure difference between suspension gap and coil slot into contact with the bridging members and locates the can member and bridging members. The can and bridging members may be formed of stainless steel and deformation may be plastic.

10 Claims, 2 Drawing Sheets

ELECTROMAGNETIC BEARING WITH A STATIONARY ARMATURE CANNING ARRANGEMENT

BACKGROUND

This invention relates to electromagnetic bearing arrangements of the type in which a stationary armature (stator) surrounds and is spaced from a rotatable armature (rotor) and in particular to canning arrangements which isolate the armatures physically but not magnetically.

It is known to have an electromagnetic bearing (hereinafter for convenience called simply a magnetic bearing) in the form or a radial or journal bearing for supporting a shaft of heavy high-speed plant, such as a fluid compressor or turbo-machine driven by compressed gas or in the form of an axial or thrust, bearing for supporting the shaft against loads applied thereto axially.

Such a magnetic bearing is by its very nature, non-contact-making in operation to the extent that if the rotor carries an impeller, or the like, exposed to process fluid in the machine, possibly at high pressure, the suspension gap of the bearing is likewise exposed to such gas and/or pressure absent intervening complex sealing arrangements.

One electromagnetic radial bearing arrangement is described in patent publication WO95/134771, where it is of prime consideration that the radial bearing is able to operate exposed to high pressure of, and contact with, process fluid. In other configurations of magnetic radial bearings, it may be desirable for the suspension gap to be exposed to process fluid for the latter to serve to extract heat from the electromagnetic coils of the stator.

It will be appreciated that for a number of reasons it may not be conducive to efficient operation or the bearing for the process fluid to be in uncontrolled contact with the bearing arrangement. For example that fluid may react chemically with the component materials of the bearing and or the presence of fluid in high speed rotating bearing may give rise to windage problems.

It is known for the components of such a magnetic bearing arrangement to be isolated physically from the suspension gap exposed to the fluid by canning arrangements, as in the aforementioned WO 95/13477 and U.S. Pat. No. 4,827,169. This U.S. patent discloses a hybrid electromagnetic-hydrodynamic bearing in which a stator can member comprises a tubular part or sleeve of ceramic (or possibly other non-metallic material) which is rigid enough and strong enough to provide with the stator, a canning arrangement shaped and profiled to withstanding bearing pressing within the suspension gap. That patent specification teaches, as a result, a sleeve having appropriate properties but a thickness which results in the stator pole faces being separated from the rotor by a considerable distance, and even allowing for maximising the strength of the sleeve by having portions of increased thickness in the coil slots between adjacent pole pieces. If, as the patent specification teaches, the magnetic bearing is principally as a means of damping vibrations in tho hydrodynamic bearing and emergency support should the latter fail, the intrusion of the sleeve into the magnetic circuit may not be of prime significance, but they complicate construction of the stator and rotor parts.

Whereas the use of a relatively thin, non-ferromagnetic, metal canning material offers minimal increase in separation between stator and rotor poles to maintain a given suspension gap the assembly of such canning arrangement, particularly with respect to accurately lining the coil-slotted stator without requiring a greater separation than the thickness of the can metal itself, is difficult to achieve with normal engineering tolerances for constructing and assembling parts.

Although the above discussion has concentrated on a radial bearing form, the criteria are equally applicable to an axial bearing form.

It is an object of the present invention to provide an electromagnetic bearing arrangement including a stator canning arrangement that is of simple and advantageous construction. It is also an object of the present Invention to provide a method of locating a stator canning arrangement within a magnetic bearing arrangement.

SUMMARY OF INVENTION

In accordance with the present invention an electromagnetic bearing arrangement comprises (a) a rotatable armature affixed to and rotatable with a shaft, (b) a stationary armature, surrounding the shaft and separated from the rotatable armature by an annular suspension gape comprising an array of magnetic pole pieces, extending towards the rotatable armature and terminating in pole races facing towards the rotatable armature, separated by, and bounding, at least one electromagnet coil slot, and (c) a stationary armature canning arrangement disposed coaxially with, and lining, said stationary armature to isolate the stationary armature physically from the suspension gap, said canning arrangement comprising (i) in each said coil slot, in each of the pole pieces bounding the slat, a shoulder facing the rotatable armature displaced further than said pole faces from said rotatable armature, (ii) in each coil slot a bridging member extending between, and supported on, the shoulders of said bounding pole pieces against displacement away from the rotatable armature, the bridging member having a support face, directed toward the rotatable armature, displaced further than the bounding pole faces therefrom, and (iii) a deformable can member of non-ferromagnetic material in the gap between the stationary armature pole faces and the rotatable armature dimensioned such that the can member is supported on the array of the pole faces, said can member, for operation of the bearing arrangement, being deformed between polo faces, by pressure difference between the suspension gap and each coil clot, into abutment with each said bridging member [and deformed about the edges of the bounding pole faces] to locate the can member, and each bridging member, with respect to the stationary armature.

Further in accordance with the present invention a method of locating a stationary armature canning arrangement within a magnetic bearing arrangement having (a) a rotatable armature affixed to, and rotatable with, a shaft, (b) a stationary armature, surrounding the rotatable armature and separated therefrom by an annular suspension gap, comprising an array of magnetic pole pieces, extending towards the rotatable armature and terminating in pole face, facing towards the rotatable armature, separated by, and bounding, at least one electromagnet coil slot , the method comprising providing in the sides of the pole pieces bounding each coil slot shoulders racing the rotatable armature displaced further than said pole faces from the armature, disposing in each coil slot a bridging member, supported by the shoulders or bounding pole pieces against displacement away from the rotatable armature having a support face directed towards the rotatable armature and displaced further than the bounding pole faces therefrom, and disposing a can member of deformable non-ferromagnetic material in the gap between rotatable and stationary armature supported by the pole faces, leaving an unsupported region aligned with each said bridging member, and exposing the suspension gap to a pressure difference with respect to the coil slot of sufficient magnitude to deform each unsupported region of the can member away from the rotatable armature into abutment with said support race of the associated bridging member.

The bearing arrangement may be of a radial or axial form with the canning arrangement suitably configured for the analogous, but different forms of stator structures.

BRIEF DESCRIPTION OF THE DRAWINGS

Embodiments of the invention will flow be described by way of example with reference to the accompanying drawings, in which.

DETAILED DESCRIPTION OF PREFERRED EMBODIMENTS

Figure 1:
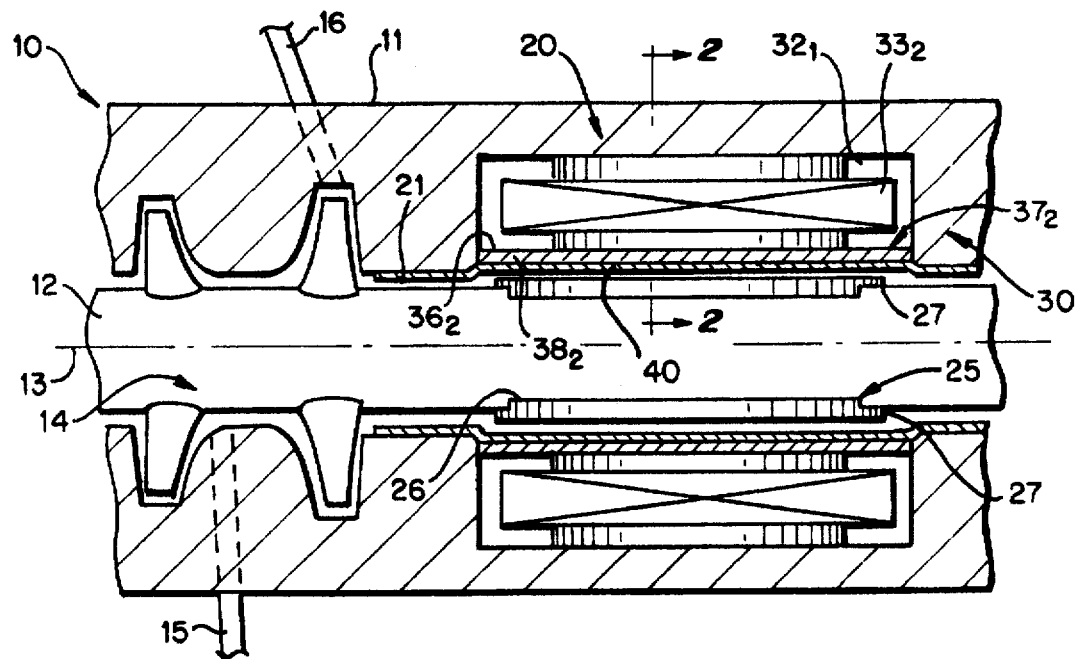
FIG. 1 is a sectional elevation through part of a gas compressor including a shaft-mounted, multi-stage impeller arrangement and a canned electromagnetic radial bearing arrangement for supporting the shaft within a suspension gap open to compressed process gas, the magnetic bearing arrangement including a stator canning arrangement in accordance with the present invention.

Referring to FIG. 1, a gas compressor 10 has a housing 11 in which a shaft 12 is rotatable (at least nominally) about its longitudinal axis 13. An multi-bladed impeller arrangement 14, which serves to draw in process gas through duct 15 and expel it at elevated pressure through duct 16, is affixed to the shaft for rotation thereby.

The shaft is driven in rotation by a motor (not shown) and is supported by an electromagnetic radial, or journal, bearing arrangement indicated generally at 20.

In general terms it will be appreciated that as the shaft is suspended by electromagnetic forces only, the suspension gap 21 between the shaft and the housing is exposed to the process gas, and, being adjacent to the high pressure end, is operationally subjected to high gas pressure.

Figure 2:
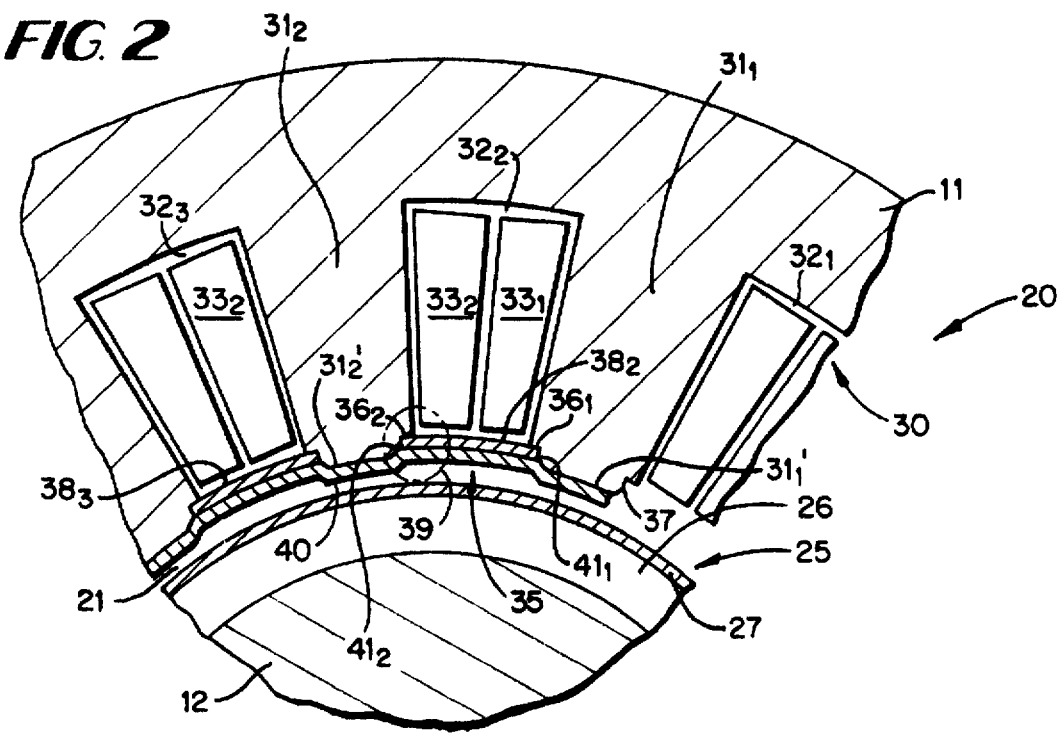
FIG. 2 is a sectional elevation through a portion of the rotatable shaft and magnetic journal bearing arrangement of FIG. 1 showing in greater detail the stator canning arrangement.
Figure 3:
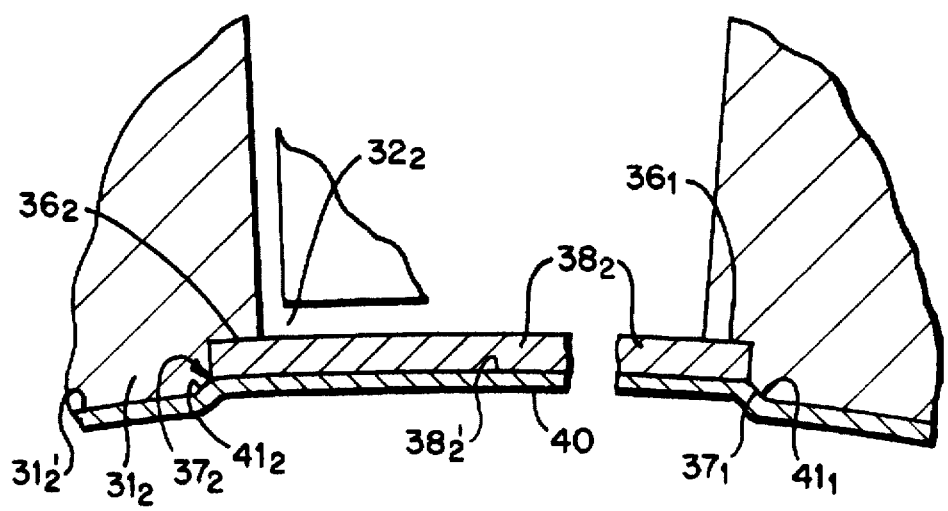
FIG. 3 is an enlargement of the encircled region of FIG. 2 showing locating of the canning arrangement and stator.

Referring also to FIGS. 2 and 3, the electromagnetic journal bearing 20 comprises a rotatable armature (hereinafter referred to as rotor) 25 affixed to, and rotatable with the shaft, the rotor being formed by a stack of ferromagnetic laminations, 26 electrically insulated from each other, shrunk onto, or set into, the surface of the shaft. The laminations are surrounded by a closely fitting rotor can 27 of non-ferromagnetic type 410 stainless steel, which provides physical separator between the rotor laminations and surrounding atmosphere. A stationary armature (hereinafter referred to as stator) 30 surrounds the rotor portion and comprises an array of radially and circumferentially extending magnetic pole pieces $31_1$ $31_2$... formed from an axially extending stack of electrically insulated ferromagnetic laminations. Each pole piece is of limited axial and circumferential extent and has a pole face $31'_1$ $31'_2$... facing radially inwardly towards the rotor, the pole pieces being separated by radially and circumferentially extending coil slots $32_1$ $32_2$... in which are located electromagnetic coils $33_1$ $33_2$... associated with, that is, wound around, the pole pieces. The pole faces and coil slots extend also axially with respect to the shaft.

It will be appreciated that the coil slots as well as the pole pieces are normally exposed to the suspension gap and thus to any process gas therein, unless isolated by a stator canning arrangement which is disposed coaxially within, arid lining, the stator.

It will be appreciated that considerable design effort is required to operate the bearing in a stable and controllable manner by having minimal suspension gap between the rotors and pole faces of the stator, and that increasing the radial distance between pole faces and rotor as a result of a stator canning arrangement requires significant extra magnetic flux and consequently results in greater heat generation within the electromagnetic coils which has to be dissipated and also make control of shaft position with respect to the more distance pole faces more difficult unless the suspension gap is itself increased and the above described factors exacerbated to another degree.

In accordance with the present invention a stator canning arrangement 35 is disposed coaxially with, and lining, the stator. In each coil slot, taking as an example coil slot $32_2$, each of the pole pieces $31_1$ and $31_2$ bounding the slot has a radially inwardly facing shoulder $36_1$ $36_2$ respectively displaced radially outwardly of the respective pole face $31'_1$ and $31'_2$. Each shoulder is conveniently, but not necessarily, formed as a notch $37_1$ $37_2$ cut into the pole face of the respective pole piece. In the coil slot $32_2$ a bridging member $38_2$ is located. The bridging member comprises a non-ferromagnetic material, preferably a stainless steel material type 410. The bridging member is of such thickness as to be substantially undeformable to radially directed pressure of a magnitude realisable in the suspension gap in the operation of the magnetic bearing arrangement. Conveniently it is formed as a slab of substantially uniform thickness and of such circumferential extent as to overlie, and be supported on, both of said shoulders $36_1$ and $36_2$ against radially outward displacement of the slab per se.

Furthermore the thickness of the slab and radial positions of the shoulders are related such that the radially inwardly facing surface $38'_2$, which comprises a support face as described below, of the bridging member is displaced radially outwardly of the boundary pole faces $31'_1$ and $31'_2$, as illustrated more clearly in FIG. 3 which shows an enlarged view of the encircled region 39.

The bridging member extends axially for the full length of the pole pieces, and possibly beyond, and the supporting shoulders $36_1$ and $36_2$ as defined by the notches $37_1$ and $37_2$ conveniently also extend for the full length of each bridging member and provide continuous axial support for the bridging member.

The stator canning arrangement further comprises a deformable cylindrical can member 40 of non-ferromagnetic material, disposed in the annular gap between the stator and the rotor, of such outside diameter that it is, in an undeformed state, supported on the array of pole faces $31'_1$ $31'_2$... and between the pole pieces, where the can member overlies the bridging members, has a small radial clearance from support faces of the bridging members. The suspension gap 21 is thus defined radially inwardly of the can member, between the can member and the rotor canning arrangement.

The can member is formed from stainless steel type 410, as for the bridging members, but relatively thin walled such that it has minimal physical presence, in terms of increasing the radial distance between pole faces and rotor, and is susceptible, for operation or the bearing arrangement, to being deformed radially between the pole faces $31'_1$ and $31'_2$ (and others) by a pressure differences between the suspension gap and coil slots into abutment with the support face of each bridging member to locate the can member with respect to the stator.

Preferably the dimension of the can member are such that the member is deformed plastically, at least about the edges $41_1$, and $41_2$ of the bounding pole races, that is, or notches $37_1$ and $37_2$, as shown in the FIG. 3 enlargement so that the can member exposed to a suitable magnitude of suspension gap pressure, is permanently deformed radially outwardly, locating it with respect to the pole faces and locating the bridging members within the notches.

Thus the canning arrangement may be provided with a can member that is a precise and minimal fit with respect to the pole pieces of the stator without the requirements for prefabricating the can member to tight tolerances based upon the dimensions of the assembled stator and having means to assemble and affix such preassembled can member with respect to the stator.

It will be appreciated that each bridging member may, because of its limited circumferential extent and support, and its material, and notwithstanding its displacement away from the suspension gap, be of small radial extent, and therefore intrude minimally into the coil slot. Consequently, each electromagnet coil nay sake full use of the slot, and be dimensioned (in terms of conductor sire and number of turns) to minimize $I^2R$ losses and thus the amount of heat which has to be extracted from the closed coil slot by conduction.

It will be appreciated that as the pole pieces are assembled from stacks of laminations stamped to profile, it is a simple modification to cut or create the notches as part of the stamping operation along with radially truncating the pole pieces, although the changes could be effected by machining the assembled stator stack if required, either before or after placing the electromagnet coils. The bridging members my be simply dropped into place and the cylindrical can member, undeformed, slid in to place from one end of the annular gap.

The profile taken by the pole faces having such notched face regions, that is, a general tapering of the poles at their faces, permits a dimensional relationship to be developed between pole face width and notch width to optimise the magnetic flux density at the air gap.

As part of the assembly operation the stator gap may be set to be a suitable pressure to deform the can member before the bearing is operated, or possibly, the can member could be left undeformed until the raising or suspension gap pressure in operation.

The structure of the stator canning arrangement thus permits a simplified construction with minor modifications to a stator design using simple and readily fabricated component parts that is, bridging members and can member.

It will be appreciated that although the can member has been described as plastically deformed about the edges of the pole faces and therefore permanently in abutment with the bridging member, the can member may be caused to deform partially or totally within elastic limits such that it is located, and locates the bridging members, only when the suspension gap is subjected to operational elevated pressure.

Additionally or alternatively, the bridging members may be other than rigid in respect of suspension gap pressure exerted thereon by way of the can member, that is, the can member and bridging member may deflect radially outwardly as a function of increased suspension gap pressure. This would permit less rigid, and possibly thinner, bridging members. If the bridging members are required to be rigid, they may be reinforced against deflection under radial pressure by the provision of ribs, and/or thickening away from the supporting shoulder.

Although it is convenient to support the bridging members for their full axial length, it may not be necessary and the shoulders $36_1$ $36_2$ etc, may be interrupted axially.

Also, the shoulders may be formed other than by notches cut into the pole faces. For example, one shoulder may be formed by a recess in the radial wall or one boundary pole piece displaced from the pole face such that the bridging member has one side inserted into the recess before being pivoted to locate the other side in an open notch in the fact of the other boundary pole face.

Also, the bridging members may be formed of any other material having suitable properties for any dimensional requirements imposed by the stator, and the can member, which is in operation totally supported radially, may be formed of a non-metallic material, such as plastics, subject to any chemical or thermal requirements.

Figure 4:
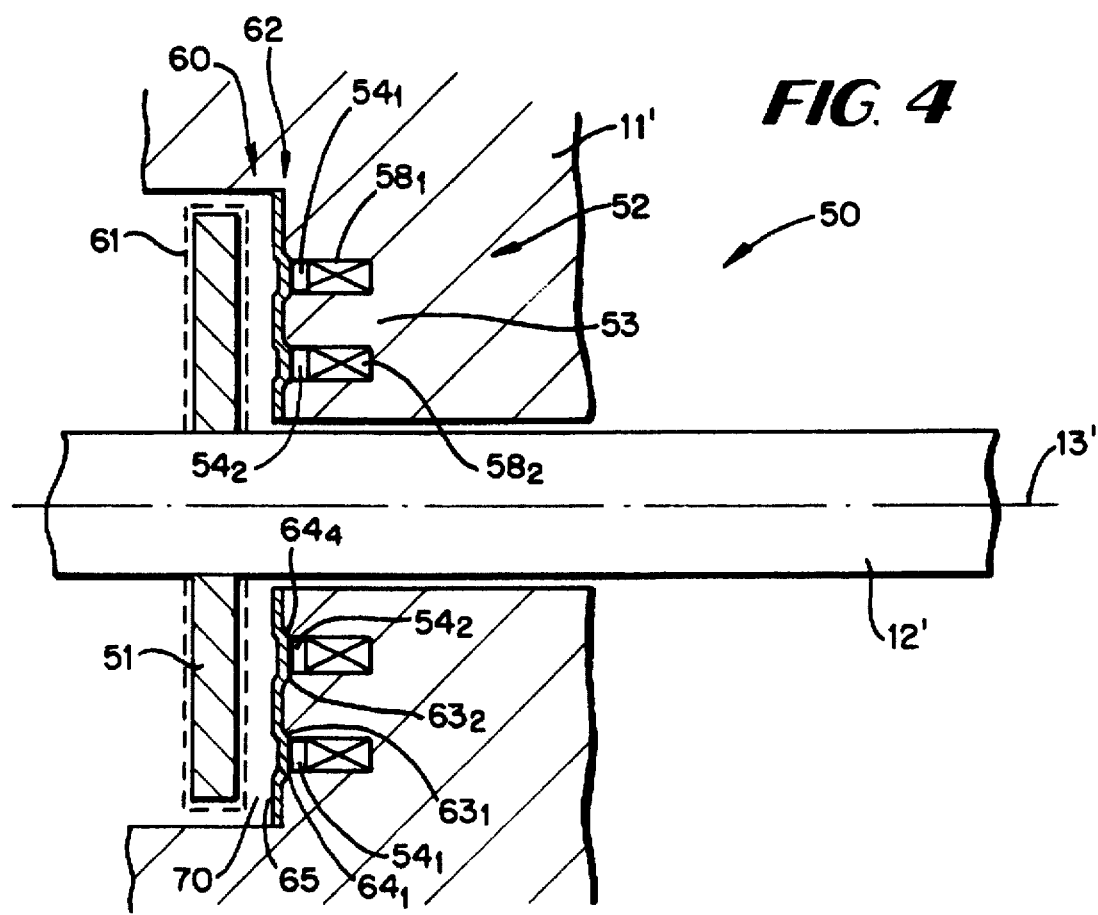
FIG. 4 is a sectional elevation through a part of an axial bearing arrangement illustrating a stator canning arrangement in accordance with the present invention.

It will be appreciated that the canning arrangement in accordance with the present invention is applicable also to an axial bearing arrangement, as illustrated in the sectional elevation of FIG. 4, and suitably adapted for the different bearing construction.

Referring to that figure, which shows a position of housing 11' containing a shaft 12' rotatable about axis 13', an axial electromagnetic bearing 50 comprises a radially extending rotor disc 51 carried by the shaft and formed of a solid, not laminated, ferromagnetic material.

Spaced axially from at least one face of the rotor is a stator 52 comprising a laminated stator body 53 which extends about the shaft and includes at least one electromagnetic coil slot $54_1$ also extending about the shaft. Typically, a second coil slot $54_2$ is provided radially displaced from the first such that the stator has in sectional elevation three axially extending pole pieces 55, 56 and 57 notwithstanding that the pole facts thereof are circular about axis 13' when viewed in an axial direction. An electromagnetic coil $58_1$, $58_2$ is located in each coil slot.

A canning arrangement 60 in accordance with the present invention may comprise a stainless steel can member 61 sheathing the rotor disc, although this nay be unnecessary unless the rotor material itself is in danger of attack by any fluid operationally present in the suspension gap.

A stator canning arrangement 62 comprises, for each coil slot, a circular bridging member $63_1$, $63_2$ respectively made up of one uniting member or a plurality of segments, supported on notches, $64_1 \ldots 64_4$ formed in the pole faces adjacent the coil slots, the bridging members being slightly displaced axially from the plane of the pole faces. A disc-like can member 65 of the aforementioned 410 stainless steel sheet overlays the stator face supported on the pole faces but spaced from the slightly recessed bridging members. A suspension gap 70 is found between the rotor and can member.

As described above for the radial bearing, the suspension gap is filled with fluid at elevated pressure, before or during operation, such that the can member is deformed in an axial direction about the edges of the pole face notches to abut the bridging members.

As described for the radial bearing stator canning arrangement, the can member may be plastically or elastically deformed against the bridging members and the bridging members may also be deformable to some extent. Similarly, other non-ferromagnetic materials may be employed for the bridging members and can member.

I claim:

1. An electromagnetic bearing arrangement comprising
   (a) a rotatable armature affixed to and rotatable with a shaft,
   (b) a stationary armature, surrounding the shaft and separated from the rotatable armature by an annular suspension gap, comprising an array of magnetic pole pieces, extending towards the rotatable armature and terminating in pole faces facing towards the rotatable armature, separated by, and bounding, at least one electromagnet coil slot, and
   (c) a stationary armature canning arrangement disposed coaxially with, and lining, said stationary armature, to isolate the stationary armature physically from the suspension gap,
   said canning arrangement comprising
      (i) in each coil slot, in each of the pole pieces bounding the slot, a shoulder facing the rotatable armature displaced further than said pole faces from said rotatable armature,
      (ii) in each coil slot, a bridging member extending between, and supported on, the shoulders of said bounding pole pieces against displacement away from the rotatable armature, the bridging member having a support face, directed toward the rotatable armature, displaced further than the bounding pole faces therefrom, and
      (iii) a deformable can member of non-ferromagnetic material in the gap between the stationary armature pole faces and the rotatable armature dimensioned such that the can member is supported on the array of the pole faces, said can member, for operation of the bearing arrangement, being deformed between pole faces, by pressure difference between the suspension gap and each coil slot, into abutment with each said bridging member and deformed about the edges of the bounding pole faces to locate the can member, and each bridging member, with respect to the stationary armature.

2. A magnetic bearing arrangement as claimed in claim 1 in which at least one of the shoulders associated with each coil slot is formed as a notch cut into the pole face of the respective pole piece.

3. A magnetic bearing arrangement as claimed in claim 1 in which at least one bridging member is formed of a non-ferromagnetic metal.

4. A magnetic bearing arrangement as claimed in claim 3 in which the metal is 410 stainless steel.

5. A magnetic bearing arranged as claimed in claim 3 in which the bridging member is arranged to be substantially undeformable below a predetermined operating pressure in the suspension gap.

6. A magnetic bearing arrangement as claimed in claim 2 in which both shoulders associated with each coil slot are each formed as notches cut into the races of the respective bounding pole pieces and the bridging member associated with said coil slot comprises a slab or substantially uniform thickness and of such width as to overlie and be supported on, both said shoulders within the notches.

7. A magnetic bearing arrangement as claimed in claim 6 in which each bridging member is supported along its full length by said notches.

8. A magnetic bearing arrangement as claimed in claim 1 in which the can member is formed of a sheet of non-ferromagnetic metal.

9. A magnetic bearing arrangement as claimed in claim 7 in which the metal of the can member is of such thickness as to be plastically deformable in response to a predetermined pressure in the suspension gap.

10. An electromagnetic radial bearing arrangement comprising
    (a) a rotatable armature affixed to, and rotatable with, a shaft,
    (b) a stationary armature, surrounding the rotatable armature and separated therefrom by an annular suspension gap, comprising an array of radially and circumferentially extending magnetic pole pieces, each having a pole face facing radially inwardly towards the rotatable armature, separated by, and bounding, radially and circumferentially extending electromagnet coil slots, said pole faces and coil slots extending also axially with respect to the shaft, and
    (c) a stationary armature canning arrangement disposed coaxially with, and lining, said stationary armature, arranged to isolate the stationary armature physically from the suspension gap,
    said canning arrangement comprising
       (i) in each coil slot, in each of the pole pieces bounding the slot, a radially inwardly facing circumferentially extending shoulder displaced radially outwardly of the pole face,
       (ii) in each coil slot a bridging member extending circumferentially and supported on the shoulders of said bounding pole pieces against radially outward displacement, a radially inwardly facing surface of the bridging member being comprising a support face displaced radially outwardly of the bounding pole faces, and
       (iii) a deformable cylindrical can member of non-ferromagnetic material in the annular gap between the stationary armature pole faces and the rotatable armature dimensioned such that the can member is of nominal outside diameter equal to the pole faces supported on the array of the pole races and clear of said support face the bridging members, said can member, for operation of the bearing arrangement, being deformed radially outwardly between pole faces into abutment with said support faces to locate the cylindrical can member and bridging members with respect to the stationary armature.

* * * * *